Patented Sept. 18, 1945

2,385,088

UNITED STATES PATENT OFFICE 2,385,088

N-SUBSTITUTED DERIVATIVES OF 4,4'-DIAMINODIPHENYL ETHER

Hans Z. Lecher, Plainfield, Robert P. Parker, Somerville, and John J. Denton, Bound Brook, N. J., assignors to American Cyanamid Company, New York, N. Y., a corporation of Maine No Drawing. Application July 3, 1944,
Serial No. 543,438

6 Claims. (Cl. 260—571)

This invention relates to a new series of chemical compounds comprising organic derivatives of 4,4'-diaminodiphenyl ether useful as intermediates in the production of dyestuffs. More particularly, the present invention relates to N-substituted derivatives of 4,4'-diaminodiphenyl ether represented by the following formula:

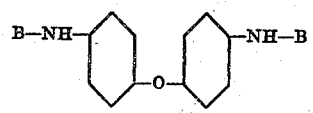

in which B is selected from the group consisting of para-nitrophenyl, para-aminophenyl, para-amino-ortho-sulfophenyl and salts of the latter two.

The amino derivatives are preferred as they have greater technical utility as bases for the production of azo dyestuffs particularly the production of ice colors by tetrazotization and coupling with appropriate ice color coupling components. These ice colors are dyes with strong blue to violet shades of superior fastness.

While the present invention is not intended to be limited to a particular method of producing the new compounds, we prefer to use a method comprising the condensation of 4,4'-diaminodiphenyl ether with a para-nitro-halogen benzene followed by reduction of nitro group to the amino group if the latter compound is desired. It is equally feasible to employ a para-nitrohalogen benzene containing a negative substituent such as sulfonic acid group. The condensation under such circumstances takes place very rapidly but it is necessary to hydrolyze off the sulfonic acid group which can be effected either before or after the reduction if the unsulfonated compound is desired. The reaction proceeds more smoothly when the reactants are dissolved in a solvent which in the case of nitrohalogen benzene containing a sulfonic acid group may be water. As hydrohalic acid is set free the presence of an acid binding agent is desirable such as a metal hydroxide, carbonate or the like. In some cases the use of a cupriferous catalyst is of advantage. Reduction of nitro to the amino group may be carried out either by alkaline or acidic reducing agents. The pH will determine whether the free bases or salts are produced.

The invention will be described in greater detail in conjunction with the specific examples which are typical illustrations. The parts are by weight.

Example 1

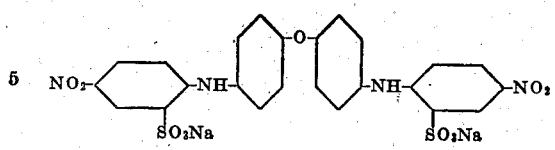

To a solution of 60 parts of sodium 2-chloro-5-nitrobenzene sulfonate in 420 parts of water are added 63 parts of calcium carbonate and 21 parts of 4,4'-diaminodiphenyl ether. The reaction mixture is heated at reflux under an atmosphere of carbon dioxide until the reaction is complete. The reaction mixture is filtered at elevated temperature and the filtrate is chilled below room temperature. Hydrochloric acid is added until the solution is acidic to Congo red test paper. After stirring for one hour, the precipitated material is removed by filtration and the filtrate is recovered. To this filtrate, soda ash is added until the solution is alkaline to brilliant yellow test paper. This solution is heated to 60° C. and is clarified from a small amount of calcium carbonate. The temperature of the filtrate is again lowered and sodium chloride is added to complete precipitation.

The salted-out product is separated by filtration and the residue is washed on the filter with ice water to remove brine. The disodium salt of 4,4'-bis N-(2''-sulfo-4''-nitrophenyl) amino diphenyl ether may be rendered chemically pure by recrystallization from dilute methanol.

Example 2

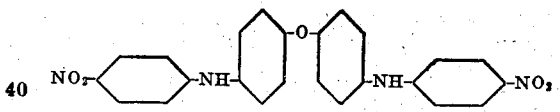

6.5 parts of the product of Example 1 is ground into a thin slurry with 100 parts of 25% hydrochloric acid. The slurry is transferred to a reaction vessel and is heated at gentle reflux for 22 hours. It changes in color from a golden yellow to a deep red-orange. The reaction mixture is cooled, and is diluted with 200 parts of water. The undissolved solid is collected on a filter, washed thoroughly with water, and dried.

4,4'-bis-N-(4''-nitrophenyl) amino diphenyl ether may be obtained chemically pure by crystallization from methanol from which it separates in the form of dark red needles and melts at 162.5° C.

Example 3

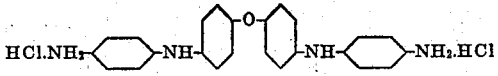

To a suspension of 8.7 parts of 4,4'-bis-N-(4"-nitrophenyl) amino diphenyl ether in 105 parts glacial acetic acid at 70° C. is added over a period of 30 minutes a solution of 35.6 parts stannous chloride dihydrate in 120 parts of concentrated hydrochloric acid. The temperature of the reaction mixture is maintained at 70° C. until reduction is complete as is indicated by loss of color. The temperature is then lowered and the solution is made strongly alkaline to phenolphthalein by addition of 20% sodium hydroxide solution. The resulting almost white diamine is collected on a filter, washed with water, reslurried in dilute sodium hydroxide, recollected on a filter and thoroughly washed with water.

Crystallization from dilute hydrochloric acid produces pure 4,4' - bis - N-(4" - aminophenyl) amino diphenyl ether dihydrochloride.

Example 4

3.7 parts of the diamine dihydrochloride obtained as described in Example 3 are stirred to a smooth paste in 60 parts of water. 9 parts of 17% hydrochloric acid are added, the temperature is adjusted at 15° C. and the diamine is tetrazotized by slow addition of 1.2 parts of sodium nitrite dissolved in 17 parts of water. 12.9 parts of salt are added and the separated solid is filtered off. The residue is reslurried in 150 parts of water, the temperature raised to 45° C. and the solution is clarified in the presence of decolorizing carbon. From the solution by addition of 35 parts of salt, a light brown precipitate forms which is collected on a filter and is washed with 5% salt solution.

The golden brown tetrazo salt is dried at low temperature and is readily soluble in water.

Example 6

3.0 parts of the tetrazonium chloride obtained as described in Example 5 are intimately mixed by blending with 2.9 parts of magnesium sulfate-dihydrate and 0.9 part of anhydrous sodium sulfate.

This color blend is completely stable to storage and is readily soluble in water.

Example 7

Five samples of cotton skeins of five parts each are wet out in 1% soap solution, rinsed and passed between squeeze rolls.

These skeins are treated in individual baths containing 1.0 part naphthol, 2.0 parts beta-ethoxy ethanol, 2.5 parts of 20% sodium hydroxide and 94.5 parts of water for ¼ hour at 45° C. They are individually wrung out and are dyed in separate baths at room temperature containing 0.3 part of the color blend as prepared in Example 6 dissolved in 200 parts of water and buffered with 3.0 parts of 20% acetic acid and 3 parts of 20% sodium acetate solutions.

When fully dyed, the skeins are cleared at 50° C. in a 3% soda ash bath, treated in a ½% soap solution at 65° C., rinsed and dried. The skeins are dyed as follows:

| Coupling component | Skein dyeing |
|---|---|
| 2-hydroxy-3-naphthoic acid-(4'-chloroanilide) | Greenish blue. |
| Bis-(acetoacetic)-o-tolidide | Golden yellow. |
| 2-hydroxy carbazole-3-carboxylic acid-(2'-methylanilide) | Dark purple. |
| 2-hydroxy-anthracene-3-carboxylic acid-(2'-methylanilide) | Green. |
| 2-hydroxy-3-naphthoic acid-(2'-ethoxyanilide) | Reddish blue. |

Example 8

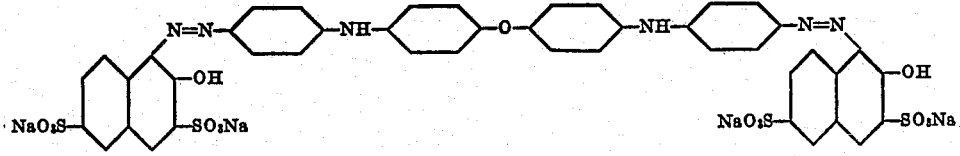

1.6 parts of the mono-sodium salt of 2-naphthol-3,6-disulfonic acid are dissolved in 80 parts of water containing 1.5 parts of soda ash. This solution is well stirred at 5° C. and a solution of 0.6 part of the blended tetrazonium chloride prepared as described in Example 6 dissolved in 15 parts of water is slowly dropped in. An immediate precipitation of a deep blue-black solid forms.

The dyestuff is filtered off and dried at 40° C. It is a dark powder, soluble in water, its aqueous solutions exhibiting a strong blue fluorescence.

Example 9

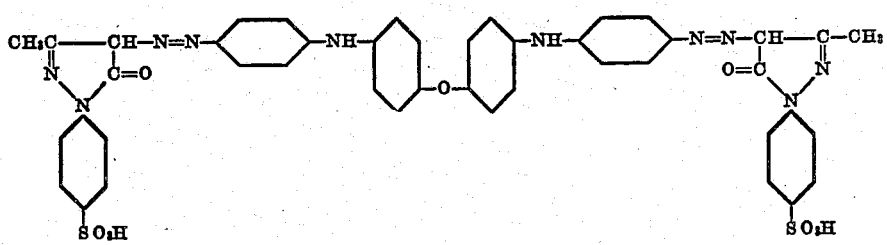

1.5 parts of 1-(4'-sulfophenyl)-3-methyl-5-pyrazolone are dissolved in 80 parts of water containing 1.5 parts of soda ash. The solution is chilled and stirred while there is dropped in a solution of 0.6 part of the blended tetrazonium chloride prepared as in Example 6 dissolved in 15 parts of water. 5 parts of salt are added and the reddish brown precipitate is filtered off and is dried at 40° C.

A red-brown powder is obtained which is soluble in water.

We claim:
1. Compounds having the formula:

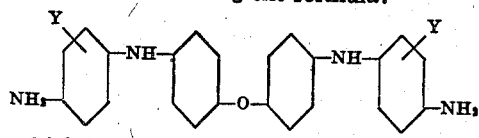

in which Y is a member of the group consisting of hydrogen, sulfonic acid and salts of sulfonic acid.

2. A chemical compound having the formula:

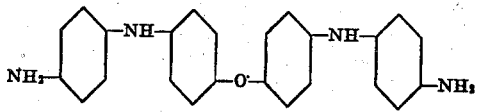

3. In the method of preparing a 4,4'-bis-amino phenyl amino diphenyl ether the step which comprises heating 4,4'-diamino diphenyl ether with a 2-halogen-5-nitro benzene sulfonic acid in the presence of sufficient acid binding substance to substantially neutralize acid set free.

4. The method of preparing 4,4'-bis-aminophenyl amino diphenyl ether which comprises heating a 4,4'-diamino diphenyl ether with a 2-halogen-5-nitro benzene sulfonic acid in the presence of a sufficient amount of acid binding substance to substantially neutralize acid set free, hydrolyzing off the sulfonic acid group and reducing the nitro groups to amino groups.

5. An addition salt of a compound according to claim 1.

6. An addition salt of the compound of claim 2.

HANS Z. LECHER.
ROBERT P. PARKER.
JOHN J. DENTON.